United States Patent [19]
Skaar et al.

[11] Patent Number: 5,299,086
[45] Date of Patent: Mar. 29, 1994

[54] LOW STIFFNESS SPRING FOR DRAG INDUCTION AND COMPONENT RETENTION IN COMPUTER DATA CARTRIDGES

[75] Inventors: Leif Skaar; Kenneth Sheppard; Donald Stanley, all of San Diego, Calif.

[73] Assignee: Verbatim Corporation, Charlotte, N.C.

[21] Appl. No.: 1,056

[22] Filed: Jan. 6, 1993

[51] Int. Cl.5 ............................................. G11B 23/087
[52] U.S. Cl. ................................................... 360/132
[58] Field of Search ........................ 360/132; 242/199

[56] References Cited
U.S. PATENT DOCUMENTS

| | | | |
|---|---|---|---|
| 4,102,516 | 7/1978 | Anglin et al. | 242/199 |
| 4,526,330 | 7/1985 | Shimizu | 242/199 |
| 4,561,609 | 12/1985 | Collins et al. | 242/192 |
| 4,619,420 | 10/1986 | Schoettle | 360/132 |
| 4,672,498 | 6/1987 | Harada | 360/132 |
| 4,781,340 | 11/1988 | Shiba et al. | 242/199 |
| 4,974,791 | 12/1990 | Carroll | 242/199 |
| 4,986,491 | 1/1991 | Gelardi et al. | 242/199 |
| 5,042,740 | 8/1991 | Schoettle et al. | 242/199 |
| 5,094,434 | 3/1992 | Ryu | 360/132 |

Primary Examiner—Robert S. Tupper
Attorney, Agent, or Firm—Albert C. Smith

[57] ABSTRACT

A multi-armed spring in a data tape cartridge is formed from a planar sheet of resilient material and is shaped and mounted to maintain loose components in place during assembly, and to press tape hubs and belt rollers toward a base portion of the cartridge, thereby to provide tension and lateral position for the tape within the cartridge. The spring has five arms extending from a central mounting region, with first arm and a second arm extending substantially in opposite directions from the central region to corner belt rollers. A third arm extends from the central region in a direction perpendicular to the aligned first arm and second arm to a drive roller for the belt. A fourth arm extends from the central region in an angular direction intermediate the right angle formed by the first arm and third arm to a tape hub, and a fifth arm extends from the central region in an angular direction intermediate the right angle formed by the second arm and third arm to another tape hub. Each arm extends substantially to the center of the associated rotating component in the data tape cartridge to control drag friction of the corner belt rollers and to control axial positioning of the tape hubs and drive roller of the cartridge.

10 Claims, 5 Drawing Sheets

LOW STIFFNESS SPRING FOR DRAG INDUCTION AND COMPONENT RETENTION IN COMPUTER DATA CARTRIDGES

1. TECHNICAL FIELD OF THE INVENTION

This invention relates to a spring in a data cartridge, and more particularly to a multi-armed pressure spring used to provide tension in the tape of the cartridge, to keep loose components in place during assembly, and to press tape hubs toward the base portion of the cartridge housing to control axial movement.

2. BACKGROUND OF THE INVENTION

Video tape cassettes such as for VHS and Beta format recorded video programs, are generally made with a spring that presses the two coplanar reels of the cassette toward the base portion of the housing. Thus, the reels are less apt to float and the tape on the reels runs smoothly in a playback apparatus. The spring is punched from sheet spring material (e.g., stainless steel), and bent or curved to provide pressure to the reels when the spring is loaded in a flat position. The springs in the prior art commonly have two arms that extend to the two reels in the cassette. The spring is attached to either the base portion or the cover portion of the tape cassette housing. The sizes and shapes of the springs may vary slightly depending on the cassette size, the reel size, and spacing of the two coplanar reels, and the like.

Tape tension in data tape cartridges require different considerations than in video cassettes. Data cartridges generally have 5 rotating elements, including two corner rollers, two tape hubs, and a drive roller. Thus, for unitary construction and low part count, a spring with 5 arms is desirable to accomodate the data cartridge construction. Unlike video cassettes which generally play in one direction for an extended period of time (e.g., play, fast-forward, or rewind), the tape in a data cartridge rapidly changes direction as it is moved to the required data locations on the tape. Normal speeds and the rapid change in tape direction necessitate a controlled drag on the corner rollers to keep the magnetic tape taut against the read/write head, and on the tape hubs to keep them fixed axially so that changing direction does not involve the takeup of slack which could affect the recording and retrieval of data from the tape within the cartridge.

SUMMARY OF THE INVENTION

In accordance with the present invention a multi-armed spring in a data cartridge provides tension in the tape within the cartridge, keeps loose components in place during assembly, and presses rotating components toward the base portion of the cartridge housing to control drag friction and axial float.

The spring is formed from a planar sheet of resilient material and has five arms extending from a central region. A first arm and a second arm extend in opposite directions from the central region to communicate with corner rollers. A third arm extends from the central region in a direction perpendicular to the alignment of the first arm and the second arm to communicate with a drive roller. A fourth arm extends from the central region in a direction intermediate a right angle formed by the first arm and the third arm, and a fifth arm extends in a direction from the central region in a direction intermediate a right angle formed by the second arm and the third arm, with each of the fourth and fifth arms extending to the tape hubs in the data tape cartridge.

Each arm is bent or curved away from the planar central mounting portion toward the base of the cartridge housing to provide a resilient force against the associated rotating component that translates to tension in the tape and also keeps the rotating components in place during assembly and operation.

DESCRIPTION OF THE PREFERRED EMBODIMENT

Figure 1A:
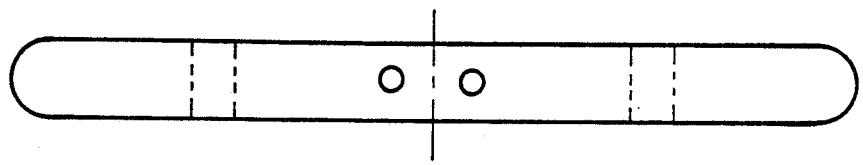
FIGS. 1(a) and 1(b) are, respectively, plan and side view illustrating a conventional spring for exerting resilient force on tape hubs in a tape cassette.
Figure 1B:

Referring now to FIGS. 1(a) and 1(b), there are shown plan and side views of a conventional spring for exerting resilient force on tape hubs or reels in a video tape cassette. Such a spring is commonly known to be mounted within the video tape cassette to Provide resilient force on the supply and take-up tape hubs or reels in order to control drag friction, and also to keep the hubs or reels in axial position during assembly and operation.

Figure 2:
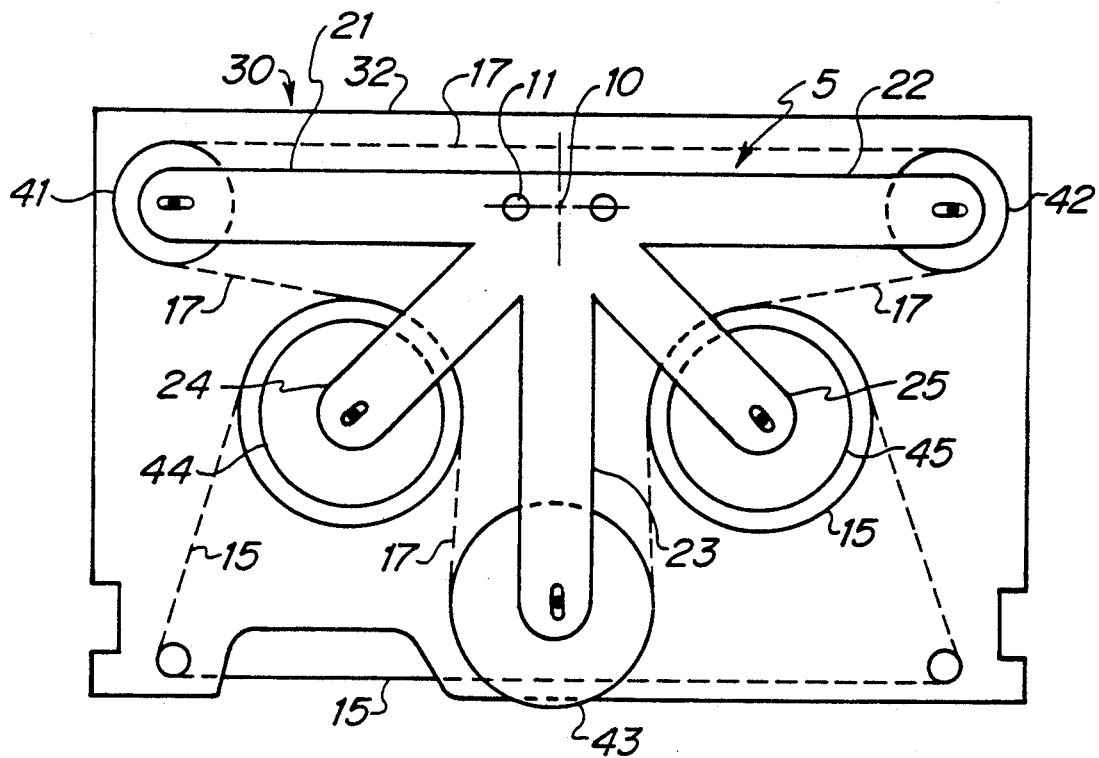
FIG. 2 is a plan view of the spring according to one embodiment of the present invention in a data tape cartridge.

Referring now to FIG. 2, there is shown a plan view of a multi-armed spring 5 in a data tape cartridge 30 that is formed from a planar sheet of resilient material such as stainless steel. The spring 5 has five arms extending from a central mounting region 10 which may be attached to the base or the cover of the cartridge. A first arm 21 and a second arm 22 extend in opposite directions from the central region 10, and a third arm 23 extends from the central region 10 in a direction perpendicular to alignment of the first arm 21 and the second arm 22. A fourth arm extends from the central region 10 in the direction of an angle intermediate the right angle formed by the first arm 21 and the third arm 23. The fifth arm 25 extends in a direction from the central region 10 in the direction of an angle intermediate the right angle formed by the second arm 22 and the third arm 23.

The first arm 21 extends a distance from the central region 10 to contact substantially the center of the corner roller 41. Similarly, arms 22-25 extend distances from the central region 10 to contact substantially the centers of the associated rollers 42, 43 and tape hubs 44, 45.

Figure 3A:
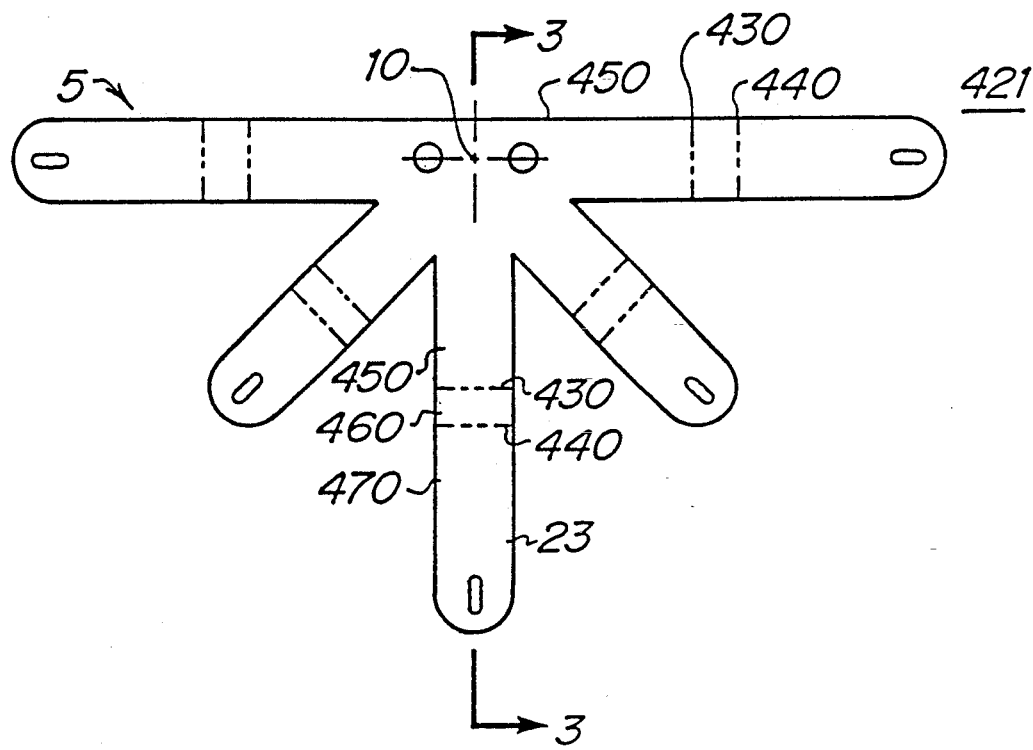
FIG. 3(a) is a plan view of the spring according to the present invention illustrating specific bending locations.
Figure 3B:
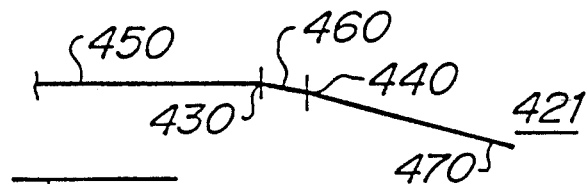
FIG. 3(b) is a partial side view of the spring of FIG. 3(a) illustrating the angular elevations of an arm relative to the planar central mounting portion.

The spring 5 is mounted in the central region 10 thereof above the rotating components 41-45, for example, on the base or cover portion of the data tape cartridge with the arms 21-25 bent to extend down toward the base of the data tape cartridge 32 to provide resilient forces against the associated rotating components 41-45 when in loaded position. As illustrated in the embodiment of FIG. 3(a), one or more arms may be transversely crimped or bent to form a deflecture at a first location 430 and a second location 440, thus defining a base section of the arm 450, a central section 460, and an end section 470. In one embodiment, the second transverse deflecture 440 is formed at a distance of approximately one third the length of the arm from the central region 10 to the end of the arm. The angle of the second deflecture 440 may be approximately 20 degrees, as illustrated in the sectional view of FIG. 3(b) from the plane of the central section 460 to the plane of the end section 470. The first deflecture 430 is formed approximately 0.25 inches inward from the second deflecture 440 in a direction toward the central region 10, and at an angle of approximately 10 degrees as measured from the plane of the base section 450, and is therefore less than the angle about the second deflecture 440. In another embodiment, the angles of the first deflecture 430 and second deflecture 440 on each arm may be made larger in order to provide more resilient force against the associated rotating components 41-45, and to provide tension in the tape 15 by providing more drag friction on the corresponding corner rollers 41, 42. Similarly, increased resilient force provided by arms 23, 24 and 25 that make contact with the hubs 44 and 45 and drive roller 43 provides control of axial motion to eliminate end play or axial float.

Figure 4A:
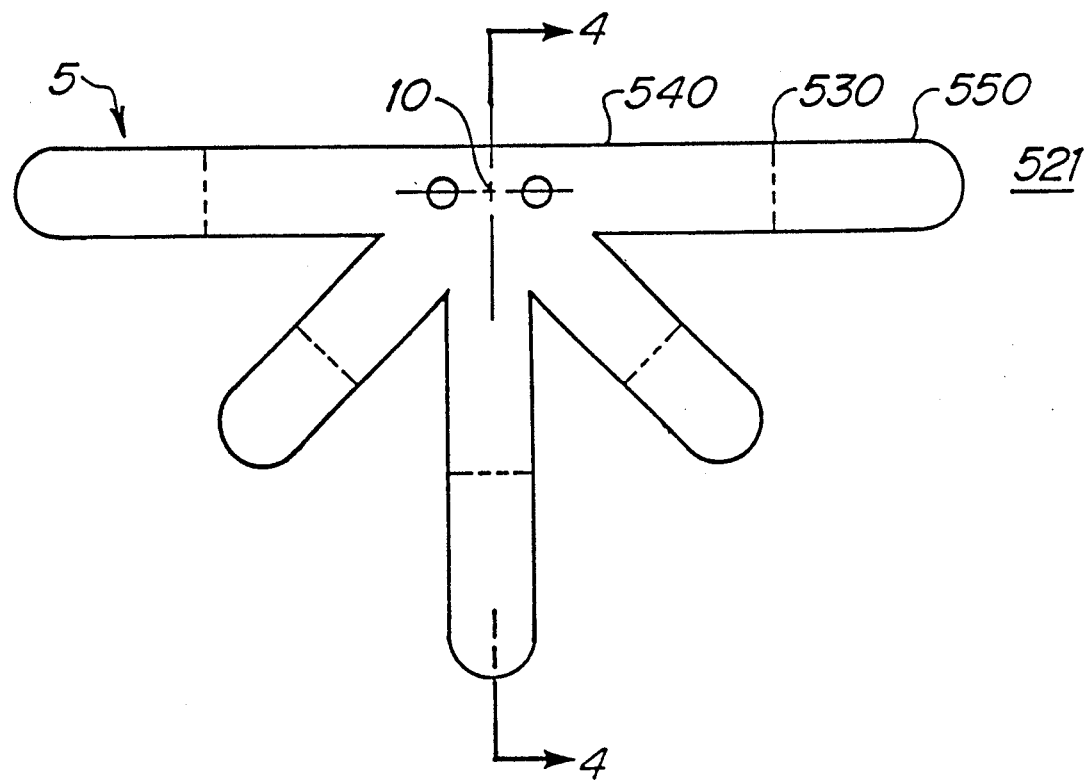
FIG. 4(a) is a plan view of a spring according to another embodiment of the present invention illustrating a single bending location per arm.
Figure 4B:
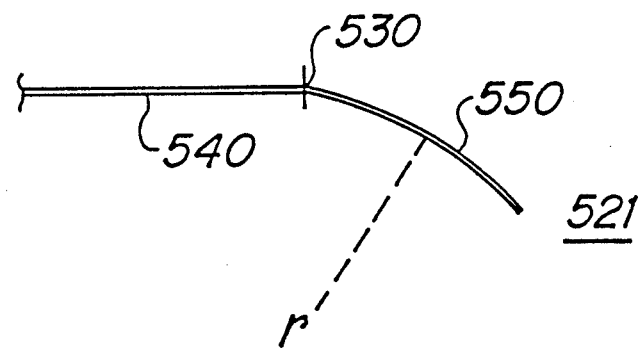
FIG. 4(b) is a partial side view of the spring of FIG. 4(a) illustrating the angular elevation of an arm relative to the planer central mounting portion.

In another embodiment of the present invention as illustrated in FIGS. 4(a) and 4(b), the deflecture of an arm forms a curve toward the base of the cartridge housing 32 starting at a location 530 that approximately one half of the length of the arm from the central region 10 to the end of the arm 521, thus defining a base section 540 and a curved section 550 of the arm 521. The radius of the curve, r, may be approximately one half the length of the arm 521 as measured from the central region 10 to the end of the arm 521 to provide substantially linear spring characteristics. Each of the arms, or only selected ones of the arms, may thus be formed to provide more resilient force on the associated rotating component, for example, the corner rollers in order to increase the tension in the tape 15 between the tape hubs 44 and 45.

Figure 5A:
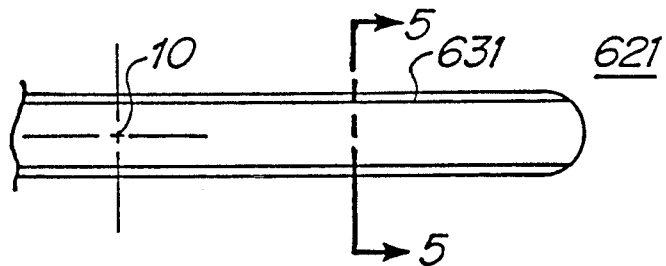
FIG. 5(a) is a partial top plan view of an arm of the spring in an embodiment of the present invention including stiffening edge folds along a portion of the length thereof.
Figure 5B:
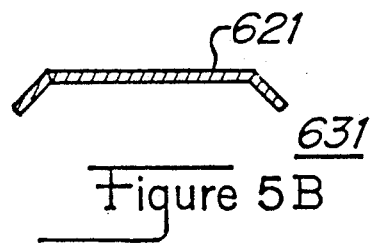
FIG. 5(b) is a sectional view of the spring of FIG. 5(a)

In another embodiment of the present invention, as illustrated in FIGS. 5(a) and 5(b), stiffening folds 630 and 640 are formed to extend longitudinally along a substantial portion of the length of the arm 621 thus defining the longitudinal edge of arm 621. Thus, the stifness of the arm 621 is increased by the folded edges 630 and 640. This embodiment allows for the spring 5 to be constructed from a thinner sheet of resilient material (e.g. stainless steel), and still provide adequate resilient force against selected ones of the associated rotating components 41-45. The increased resilient force provides tension in the tape 15 by providing more drag friction on the corresponding corner rollers 41 and 42 for the drive belt. Similarly, stiffening folds on arms 23, 24, and 25 provides increased resilient force on hubs 44 and 45 and drive roller 43 for controlling axial float. In this embodiment, the thickness of spring 5 is about 0.006 inches. The stiffeners 630 and 640 in this embodiment could also be separate thin strips of resilient material attached to the spring 5 by adhesive, by welding, or by other suitable means. It is also possible to have a varying number of stiffeners, for example, one stiffener running down the middle of the arm 621. Increased resilient force against the rotating components 41-45 could also be realized by an overall increased thickness in the resilient material of spring 5. Alternatively, the thickness in one or more of the arms 21-25 may be increased to provide increased resilient force against the associated rotating component 41-45.

Figure 6:
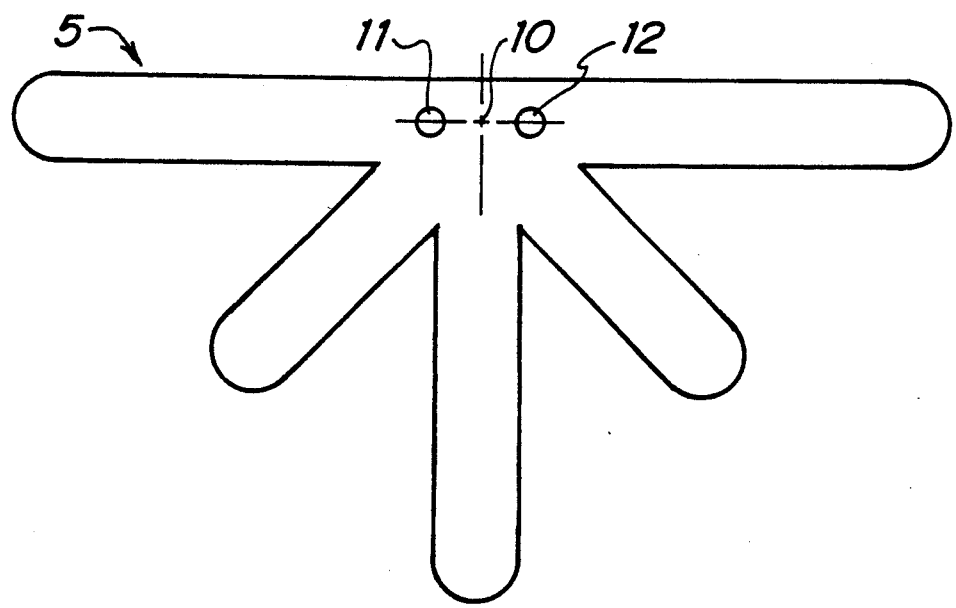
FIG. 6 is a plan view of the spring of FIG. 2 showing mounting details in the central mounting region.
Figure 7:
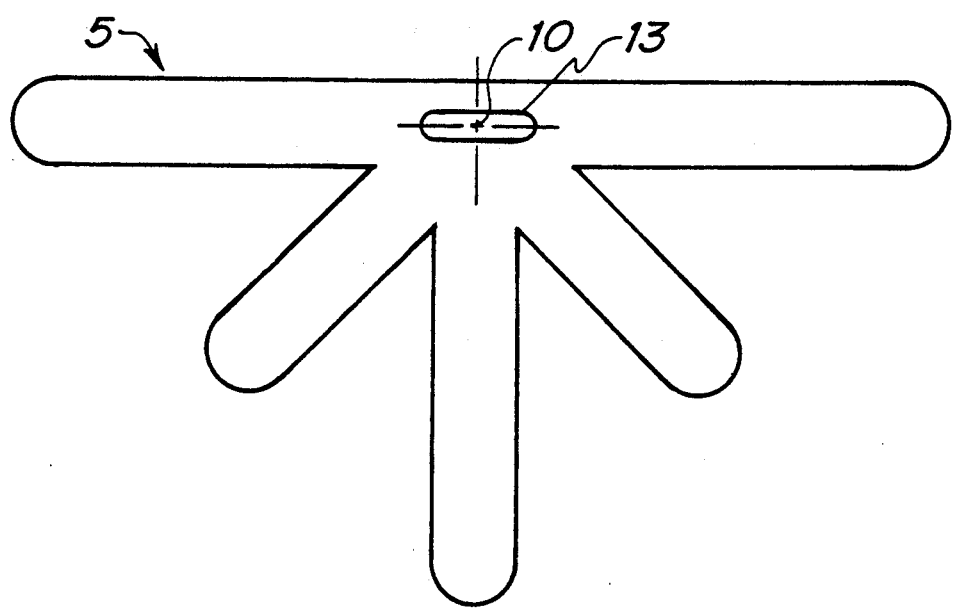
FIG. 7 is a plan view of another embodiment of the spring of FIG. 2 showing the details of a single, keyed mounting element in the central region portion.

Referring now to FIG. 6, a pair of mounting holes 11 and 12 in the central region 10 are used to facilitate attachment of the spring 5, for example, to the base of the cartridge 32. The holes 11 and 12 in one embodiment are approximately 0.125 inches in diameter. In FIG. 7, a single mounting hole 13, centered in the central region 10 facilitates the attachment of the spring 5 to the base of the cartridge 32, and may include a keying surface for assuring proper positional mounting of the spring 5 in one orientation. By attaching the spring 5 to the base of the cartridge, rotating components 41-45 can be held in place during assembly prior to the attachment of the cover of the cartridge to the base of the cartridge. Alternatively, the spring 5 may be attached in a similar fashion to the cover of the cartridge, and would be in the loaded position to provide resilient forces as previously described only after the cover of the cartridge is attached to the base of the cartridge 32.

Figure 8:
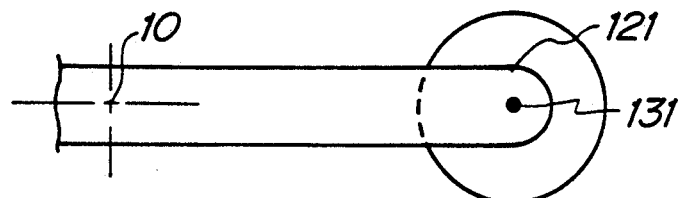
FIGS. 8(a) and 8(b) are, respectively, plan and side views of a partial arm of the spring of FIG. 2 illustrating one end embodiment.
Figure 8:
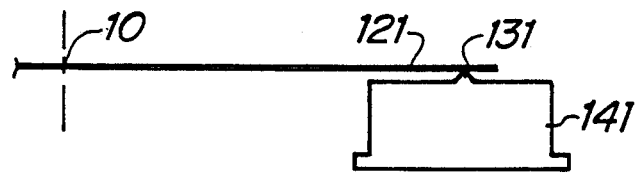

In one embodiment of the present invention, as illustrated in the plan and side views of FIGS. 8(a) and 8(b), respectively, an arm 121 makes point contact 131 with the associated tape hub or drive roller 141. In another embodiment that is preferred for the arms that make contact with the corner rollers 41 and 42, a large radius of contact can be provided between the rollers and the spring to produce more drag friction on the roller and thus produce more tension in the tape 15 that moves between the tape hubs. The end of the arm 121 may be rounded, square, or any other suitable shape to provide adequate drag friction against the corner roller 41 or 42.

Figure 9:
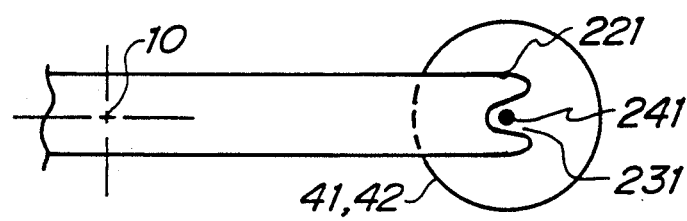
FIGS. 9 and 10(a) are plan views illustrating alternative embodiments of the ends of the arms of the spring of FIG. 2.
Figure 10:
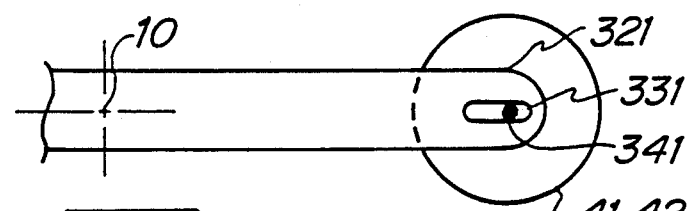
FIG. 10(b) is a sectional view of a corner roller for the drive belt in a data tape cartridge according to FIG. 2.
Figure 10:
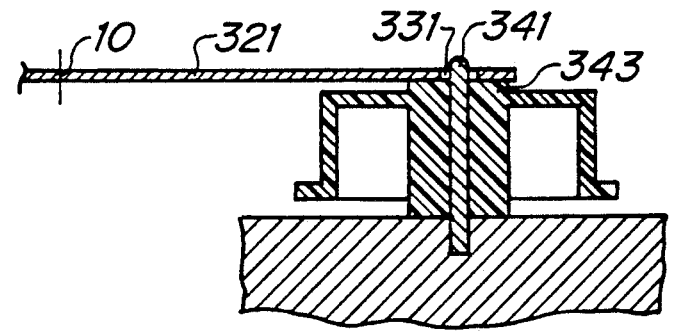

Specifically, in another embodiment illustrated in FIG. 9, an arm 221 is forked 231 at the end in order to receive the axial projection or axle 241 of the associated corner roller. In another embodiment, illustrated in FIG. 10(a), a slotted hole 331 is formed in the end of the arm 321 in order to receive the axle 341 of the associated corner roller 41,42 which may include an axial projection 343 that is larger in diameter than the axle 341 or slotted hole 331. The resulting drag friction contributed by a corner roller 41,42 is thus determined by the spring force exerted against the corner roller and by the radius of the elongated projection 343 that contacts the spring.

What is claimed is:

1. In a data tape cartridge having a plurality of rotating components operably coupled to a length of tape within the cartridge or to a drive belt for the tape within the cartridge, tensioning apparatus comprising:

an element of resilient material mounted in the cartridge and having a plurality of protruding arms including a first pair of arms disposed substantially in opposite directions to communicate with an associated spaced pair of rotating components for the drive belt, and including a second pair of arms protruding from the element in skew relationship to the alignment of said first pair to communicate with an associated spaced pair of rotating components for the tape;

the arms of said element exerting resilient force against the rotating components for the drive belt communicating therewith to control the drag friction of the associated rotating component for altering the tension in the tape, and exerting resilient force against the rotating components for the tape communicating therewith to control axial position of the associated rotating component.

2. The tensioning apparatus according to claim 1 comprising:

an additional arm protruding from the element in a direction substantially normal to the alignment of the first pair of arms for communicating with a drive roller disposed within the cartridge at a location therein which is remote from said spaced pair of rotating components, the additional arm of the element exerting resilient force against the drive roller to control the axial position thereof.

3. The tensioning apparatus according to claim 1. wherein said rotating components rotate about axes that are substantially parallel aligned, and comprising:

means disposed substantially at an intersection of the protruding arms of the element for supporting the element within the cartridge at a location therein that is displaced in a direction along the axes for exerting the resilient forces axially upon the associated rotating components.

4. The tensioning apparatus according to claim 1 wherein at least one of the protruding arms includes a deflecture therealong from substantially planar orientation to alter the resilient force exerted thereby on the associated rotating component.

5. The tensioning apparatus according to claim 4 wherein said at least one protruding arm includes plural spaced deflectures therealong to alter the resilient force exerted thereby on the associated rotating component.

6. A data tape cartridge comprising:

a housing having a plurality of rotating components axially mounted therein for operable coupling to a length of tape within the cartridge and to a drive belt for the tape within the cartridge, the cartridge comprising:

an element of resilient material mounted in the cartridge and having a plurality of protruding arms including a first pair of arms disposed substantially in opposite directions to communicate with an associated spaced pair of said rotating components for the drive belt, and including a second pair of arms protruding from the element in skew relationship to the alignment of said first pair to communicate with an associated spaced pair of said rotating components for the tape;

the arms of said element exerting resilient force against the rotating components for the drive belt communicating therewith to control the drag friction of the associated rotating component for altering the tension in the tape, and exerting resilient force against the rotating components for the tape communicating therewith to control axial position of the associated rotating component.

7. The data tape cartridge according to claim 6 comprising:

an additional arm protruding from the element in a direction substantially normal to the alignment of the first pair of arms for communicating with a drive roller for the belt disposed within the cartridge at a location therein which is remote from said spaced pair of rotating components, the additional arm of the element exerting resilient force against the drive roller to control the axial position thereof.

8. The data tape cartridge according to claim 6 wherein said rotating components rotate about axes that are substantially parallel aligned, and comprising:

means disposed substantially at the intersection of the protruding arms of the element for supporting the element on the housing within the tape cartridge at a location therein that is displaced in a direction along the axes for exerting the resilient forces axially upon the associated rotating components.

9. The data tape cartridge according to claim 6 wherein at least one of the protruding arms includes a deflecture therealong from substantially planar orientation to alter the resilient force exerted thereby on the associated rotating component.

10. The data tape cartridge according to claim 9 wherein said at least one protruding arm includes plural spaced deflectures therealong to alter the resilient force exerted thereby on the associated rotating component.

* * * * *